(12) United States Patent
Kamikake

(10) Patent No.: US 10,837,829 B2
(45) Date of Patent: Nov. 17, 2020

(54) FOURIER TRANSFORM SPECTROPHOTOMETER

(71) Applicant: SHIMADZU CORPORATION, Kyoto (JP)

(72) Inventor: Tadafusa Kamikake, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/181,776

(22) Filed: Nov. 6, 2018

(65) Prior Publication Data

US 2019/0162591 A1    May 30, 2019

(30) Foreign Application Priority Data

Nov. 24, 2017  (JP) .................................. 2017-226101

(51) Int. Cl.
*G01J 3/06* (2006.01)
*G01J 3/02* (2006.01)
(Continued)

(52) U.S. Cl.
CPC .......... *G01J 3/0202* (2013.01); *F16C 19/542* (2013.01); *F16C 19/543* (2013.01);
(Continued)

(58) Field of Classification Search
CPC .............. G01J 3/45; G01N 2021/3595; G01N 2030/743
See application file for complete search history.

(56) References Cited

U.S. PATENT DOCUMENTS 3,903,536 A    9/1975  Westerberg
4,225,236 A    9/1980  Sandercock
(Continued)

FOREIGN PATENT DOCUMENTS

| CN | 103490663 A | 1/2014 |
|---|---|---|
| DE | 2411508 A1 | 5/1975 |
| WO | 2016/147271 A1 | 9/2016 |

OTHER PUBLICATIONS

Communication from the European Patent Office dated Apr. 25, 2019, an Extended Search Report on counterpart European Application No. 18204852.0.
(Continued)

*Primary Examiner* — David P Porta
*Assistant Examiner* — Mamadou Faye
(74) *Attorney, Agent, or Firm* — Sughrue Mion, PLLC

(57) ABSTRACT

In an infrared spectrophotometer, a plurality of rolling elements are provided between a movable portion and the holding portion. While no external force is applied from a spring, a play space is generated between the movable portion, the holding portion, and each rolling element. In the infrared spectrophotometer, when the movable mirror and the movable portion are slid, an external force directed downward is applied to the movable portion by the spring, thereby preventing each rolling element from moving between the movable portion and the holding portion.

(Continued)

Accordingly, when the movable mirror and the movable portion are slid, it is possible to suppress rattling of the movable portion and the holding portion while leaving a fine gap between the movable portion, the holding portion, and each rolling element. This makes it possible to easily control the moving speeds of the movable mirror and the movable portion and to suppress rattling of the movable mirror and the movable portion.

7 Claims, 11 Drawing Sheets

(51) Int. Cl.
*G01J 3/453* (2006.01)
*F16C 19/54* (2006.01)
*G01N 21/35* (2014.01)
*F16C 25/08* (2006.01)
*F16C 29/12* (2006.01)
*F16C 29/00* (2006.01)
*F16C 29/04* (2006.01)

(52) U.S. Cl.
CPC .......... *F16C 19/547* (2013.01); *F16C 19/548* (2013.01); *F16C 25/083* (2013.01); *F16C 29/004* (2013.01); *F16C 29/043* (2013.01); *F16C 29/123* (2013.01); *G01J 3/453* (2013.01); *G01J 3/4532* (2013.01); *G01J 3/4535* (2013.01); *G01N 21/35* (2013.01); *F16C 2370/20* (2013.01)

(56) References Cited

U.S. PATENT DOCUMENTS

| | | | | |
|---|---|---|---|---|
| 4,480,914 | A | * 11/1984 | Thompson | G02B 26/08 356/452 |
| 4,575,246 | A | * 3/1986 | Nishizawa | G01J 3/4535 318/640 |
| 5,313,269 | A | 5/1994 | Ponce et al. | |
| 5,484,210 | A | * 1/1996 | Gallone | B23Q 1/262 384/40 |
| 2012/0120405 | A1 | * 5/2012 | Coffin | G01J 3/453 356/455 |
| 2013/0328967 | A1 | 12/2013 | Miyazawa | |
| 2016/0085066 | A1 | * 3/2016 | Graves | B81B 7/008 250/203.2 |
| 2018/0073927 | A1 | 3/2018 | Kamikake | |

OTHER PUBLICATIONS

Communication dated Aug. 3, 2020, from the China National Intellectual Property Administration in Application No. 201811345613.3.

\* cited by examiner

[FIG. 1]
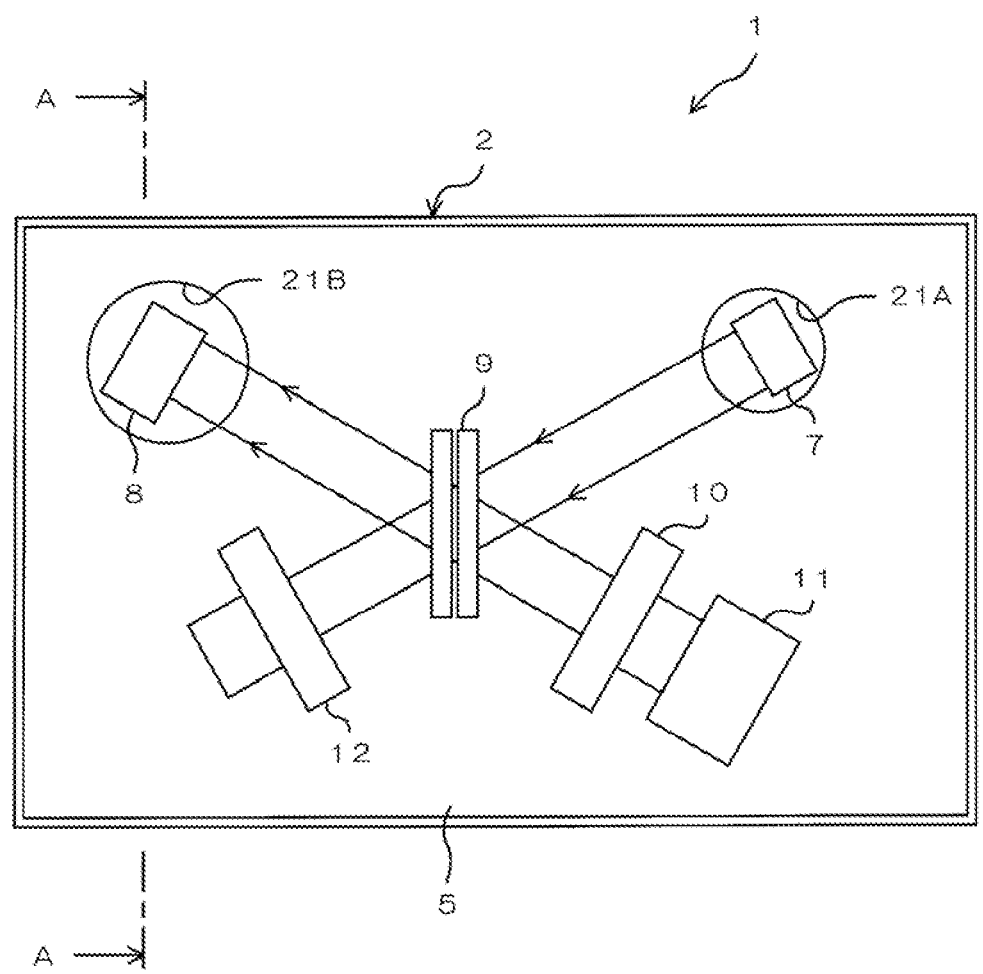

[FIG. 2]
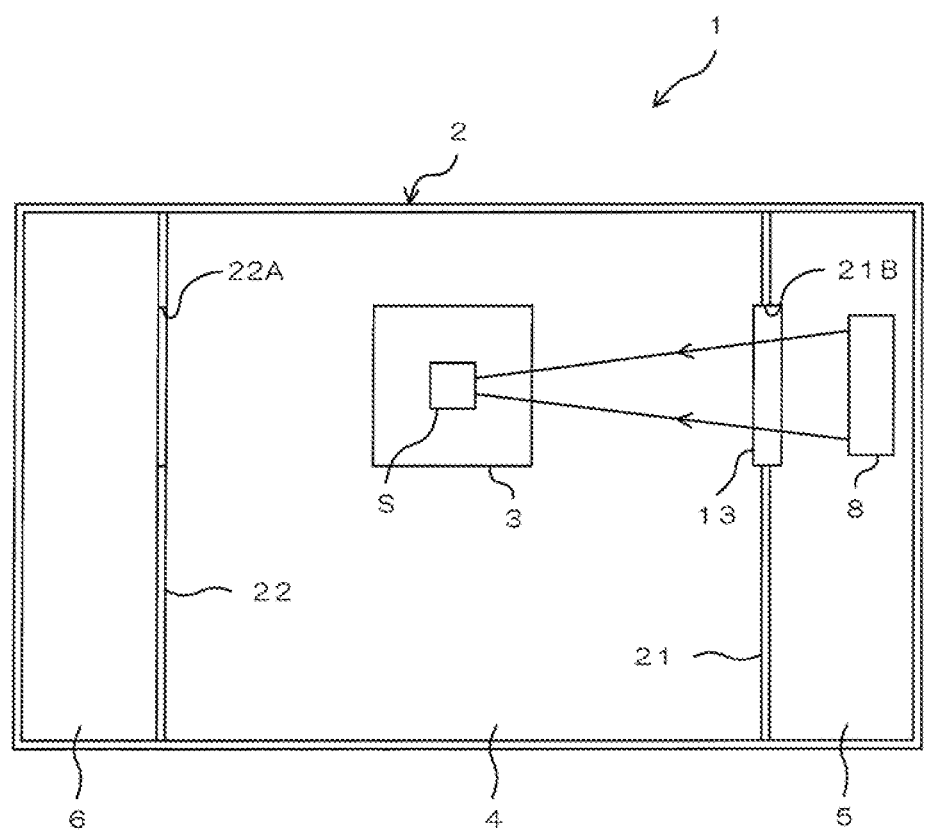

[FIG. 3]
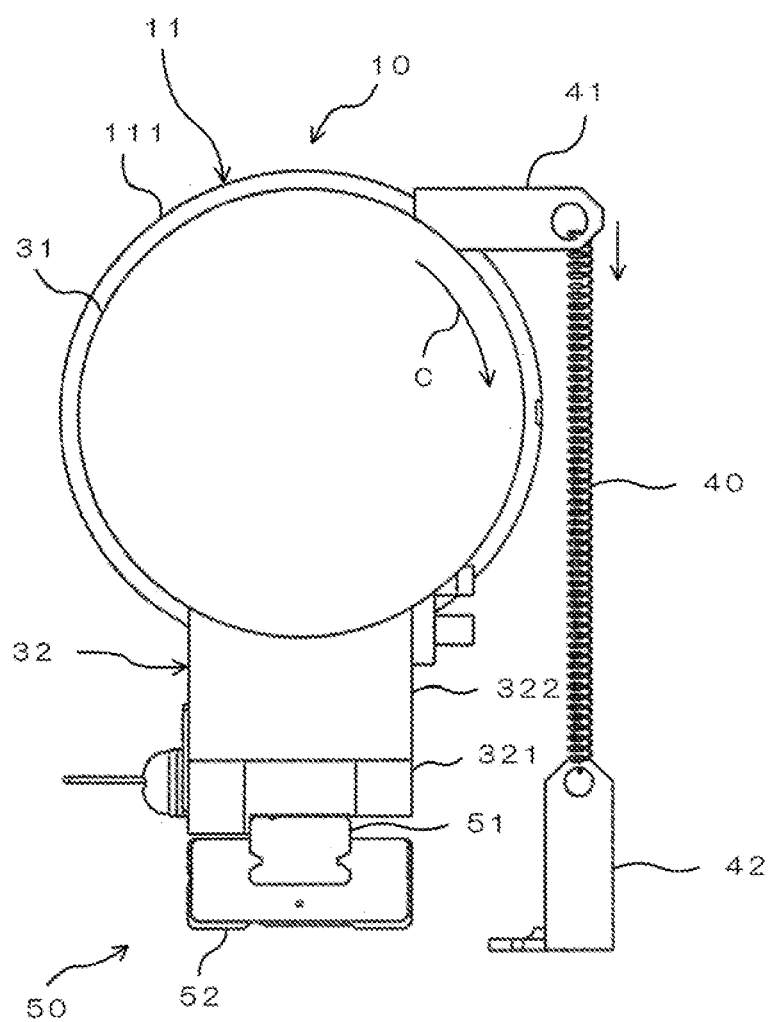

[FIG. 4]
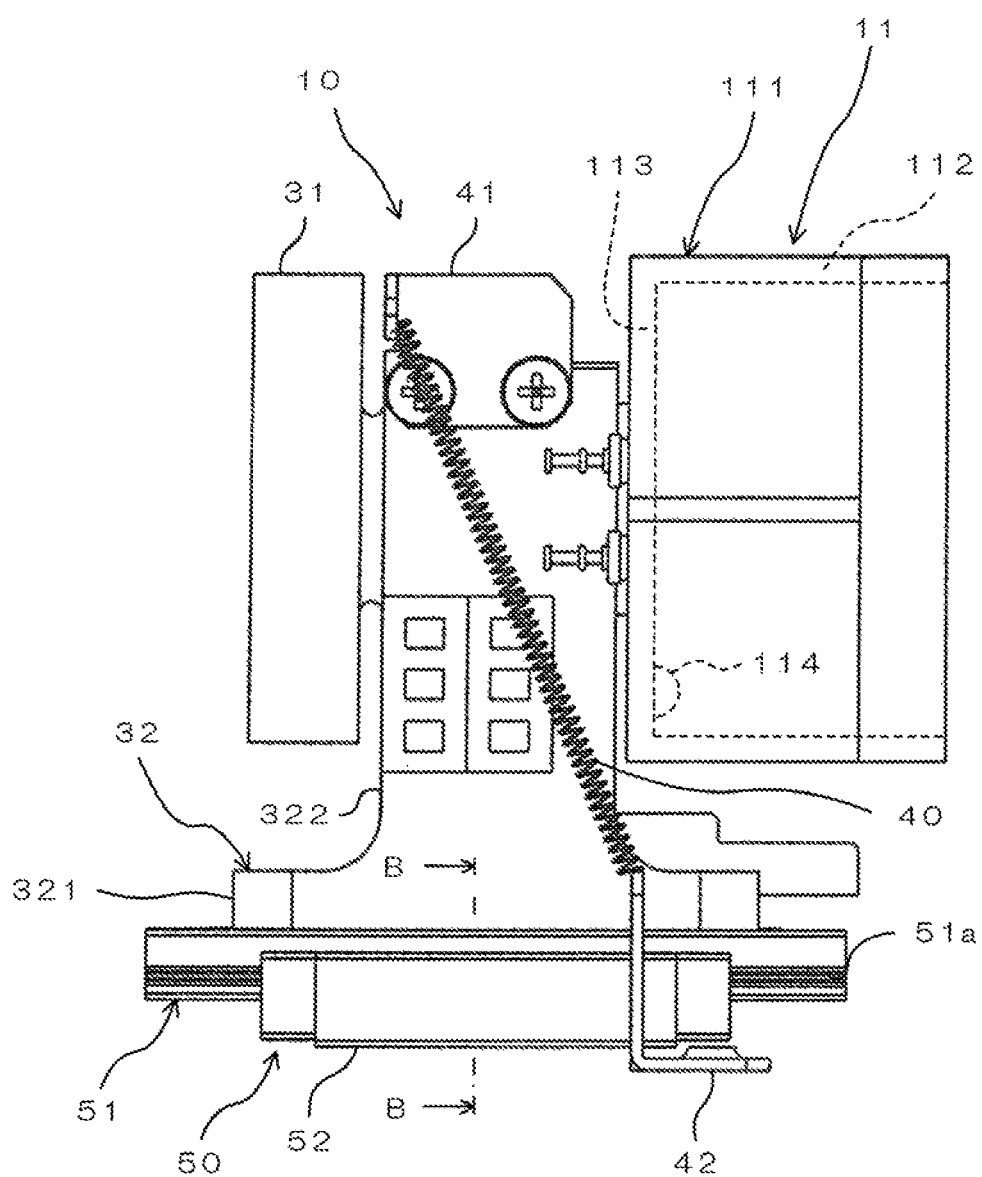

[FIG. 5]
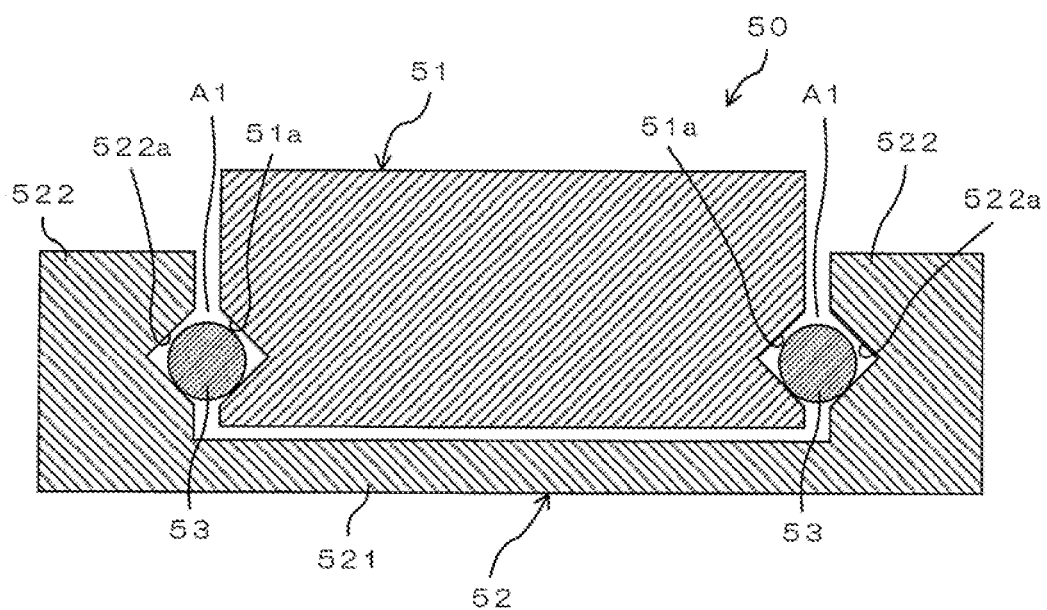

[FIG. 6]
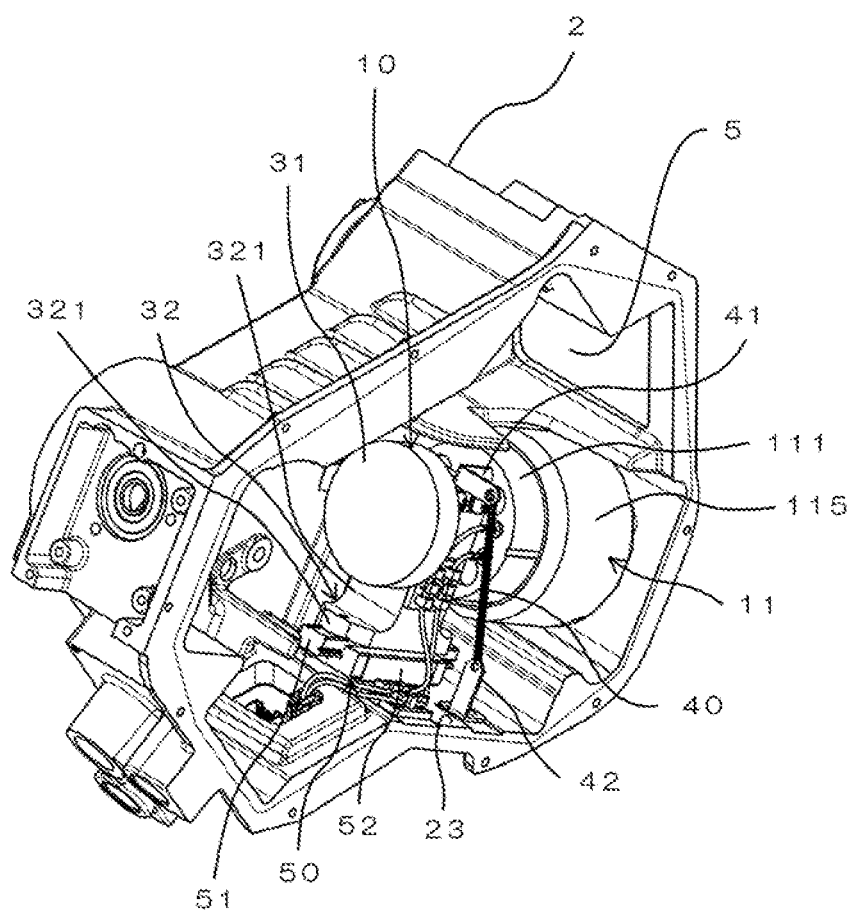

[FIG. 7A]
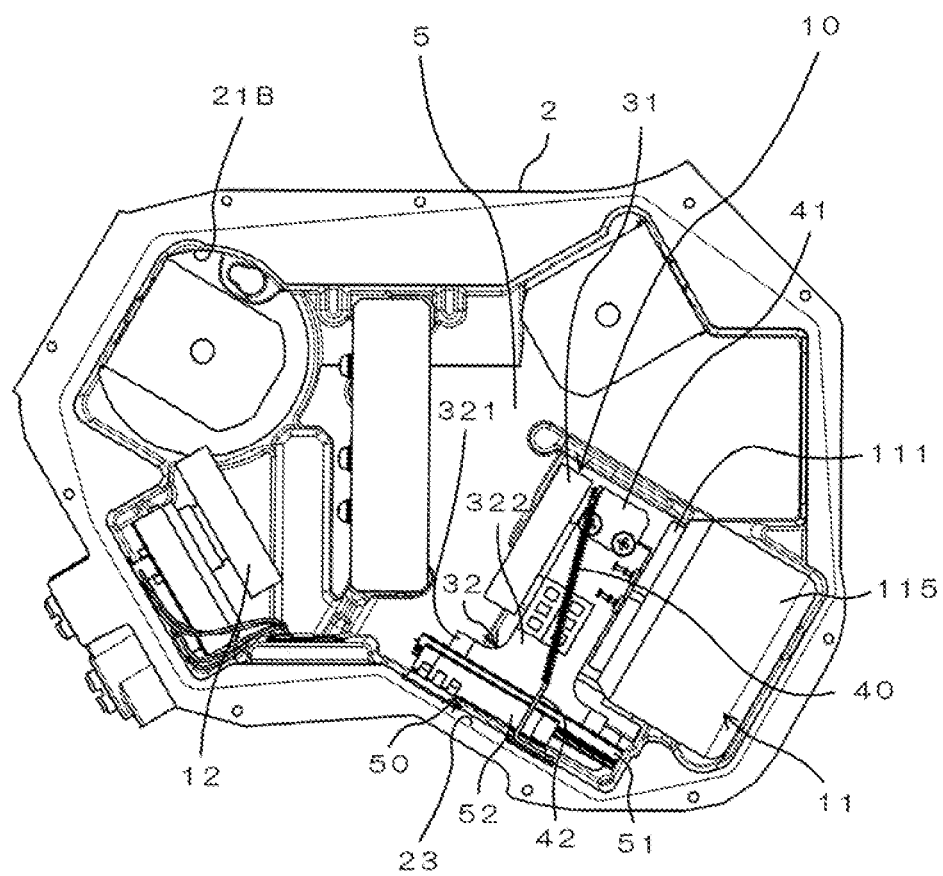

[FIG. 7B]
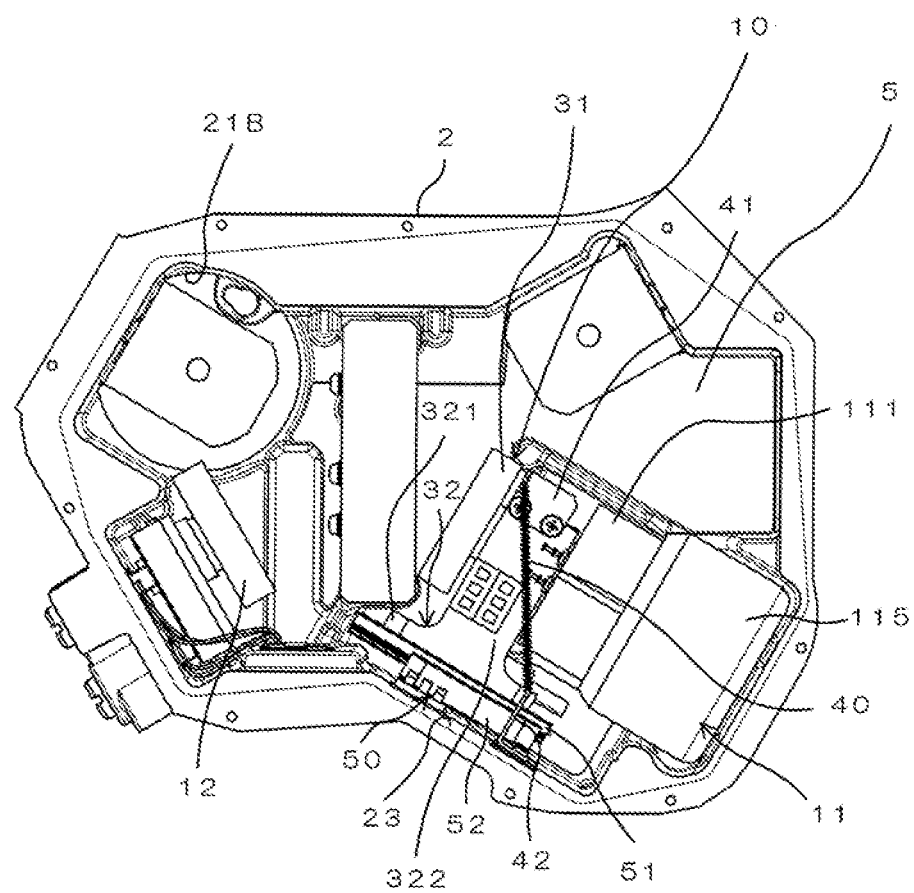

[FIG. 8A]
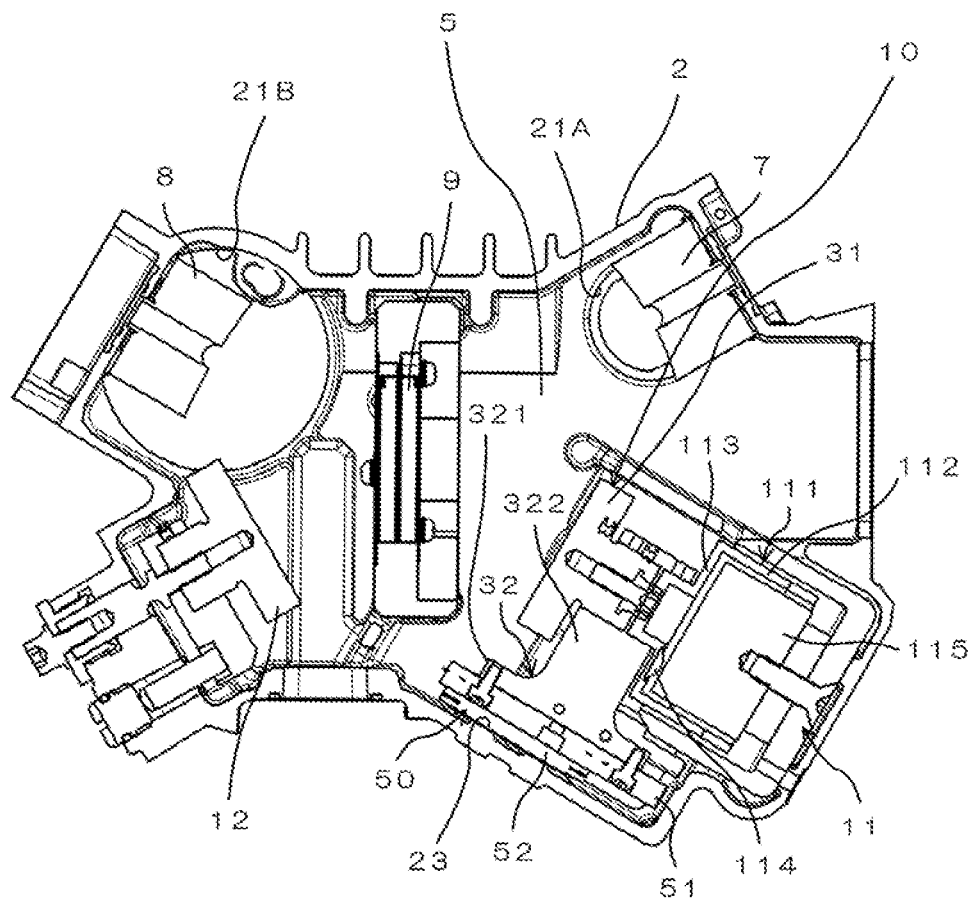

[FIG. 8B]
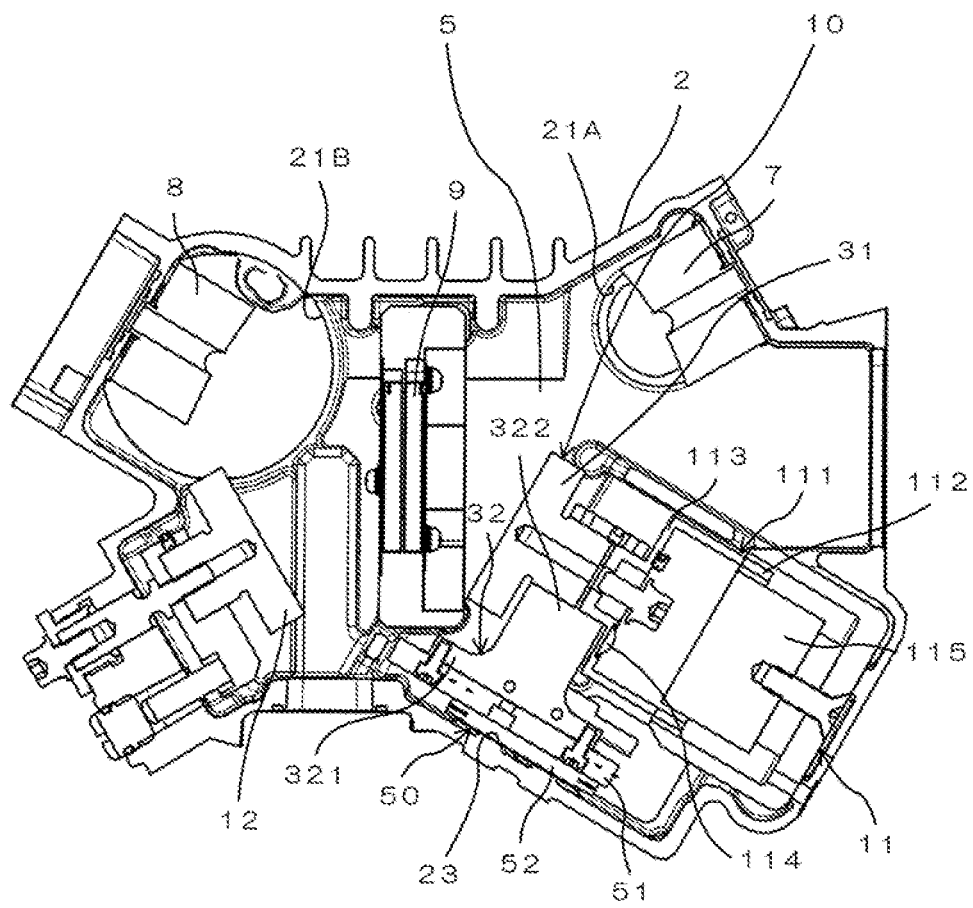

[FIG. 9]
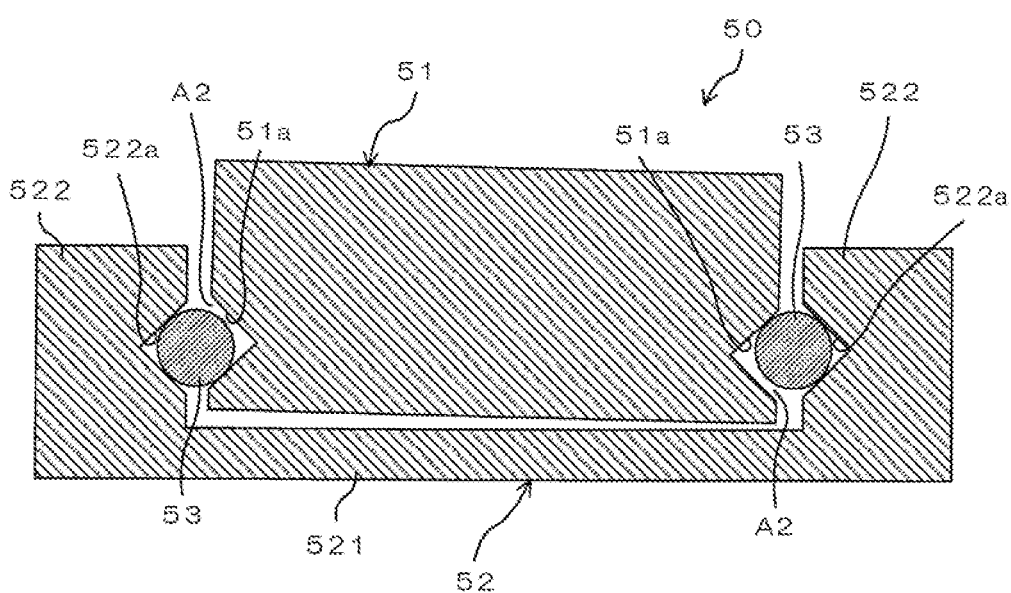

FOURIER TRANSFORM SPECTROPHOTOMETER

CROSS REFERENCE TO RELATED APPLICATION

This application claims priority to Japanese Patent Application No. 2017-226101 filed on Nov. 24, 2017, the entire disclosure of which is incorporated by reference herein.

BACKGROUND OF THE INVENTION

Field of the Invention

The present invention relates to a Fourier transform spectrophotometer including a slidable movable mirror.

Description of the Related Art

In the Fourier transform infrared spectrophotometer (FTIR), a sample in a sample chamber is irradiated with infrared light, and a detector detects transmitted light or reflected light from the sample. Then, a spectrum can be obtained by performing computation based on the detection signal. The infrared light with which the sample in the sample chamber is irradiated is formed into interference light by using a Michelson interferometer including a movable mirror, a fixed mirror, and a beam splitter, and then applied into the sample chamber (see, for example, WO 2016/147271).

The Fourier transform infrared spectrophotometer is provided with the movable mirror slidable on, for example, a guide. The movable mirror slides and moves as a driving force is applied from a driving source such as a voice coil motor.

When the movable mirror and the guide are assembled, the state of engagement between the movable mirror and the guide is adjusted, and a pre-pressure is applied to the engaging portion between the movable mirror and the guide. This adjusts a fine gap generated at the engaging portion between the movable mirror and the guide. When the movable mirror is moved relative to the guide, a resistance force is generated between the movable mirror and the guide.

By adjusting the resistance force generated in this manner and the driving force from the driving source, it is possible to adjust the moving speed of the movable mirror.

However, in the conventional Fourier transform infrared spectrophotometer as described above, the smooth movement of the movable mirror has been hindered in some cases.

Specifically, when the pre-pressure applied to the engaging portion between the movable mirror and the guide is too large, the engagement state between the movable mirror and the guide becomes too strong, so that the resistance force generated between the movable mirror and the guide becomes larger than necessary. Therefore, it is difficult for the movable mirror to slide and move, and it is difficult to control the moving speed of the movable mirror with a predetermined accuracy or more.

On the other hand, if the pre-pressure applied to the engaging portion between the movable mirror and the guide is reduced, the resistance force generated between the movable mirror and the guide is reduced, and the movable mirror can be easily slid and moved. However, in this case, the gap generated at the engaging portion between the movable mirror and the guide becomes large, and the movable mirror may rattle against the guide. When the movable mirror rattles against the guide, the angle of the movable mirror changes, thus adversely affecting the analysis.

SUMMARY OF THE INVENTION

The present invention has been made in view of the above circumstances, and an object thereof is to provide a Fourier transform spectrophotometer capable of suppressing rattling of a movable mirror while realizing smooth movement of the movable mirror.

(1) A Fourier transform spectrophotometer according to the present invention includes a movable portion, a holding portion, a rolling element, and an external force applying portion. A movable mirror is attached to the movable portion. The holding portion slidably holds the movable portion. The rolling element is provided between the movable portion and the holding portion so as to have a play space with respect to the movable portion and the holding portion while no external force is applied. The rolling element rolls when the movable portion slides with respect to the holding portion. The external force applying portion prevents the rolling element from moving between the movable portion and the holding portion by applying an external force to at least one of the movable portion and the holding portion in a direction intersecting with a sliding direction of the movable portion.

According to such a configuration, in the Fourier transform spectrophotometer, the rolling element is provided between the movable portion and the holding portion. In addition, while no external force is applied from the external force applying portion, a play space is generated between the movable portion, the holding portion, and the rolling element. In the Fourier transform spectrophotometer, when the movable mirror is slid, an external force is applied to at least one of the movable portion and the holding portion in a direction intersecting the sliding direction by the external force applying portion, and the rolling element is prevented from moving between the movable portion and the holding portion.

Therefore, when the movable mirror is slid, it is possible to suppress rattling of the movable portion and the holding portion while leaving a fine gap between the movable portion, the holding portion, and the rolling element.

This makes it possible to easily control the moving speed of the movable mirror and to suppress rattling of the movable mirror.

That is, in the Fourier transform spectrophotometer, it is possible to suppress rattling of the movable mirror while realizing smooth movement of the movable mirror.

(2) In addition, the movable portion may be slidable along the sliding direction from the standby position. The external force applying portion may apply an external force to the movable portion toward the standby position.

According to such a configuration, the external force applying portion can always apply an external force toward the standby position to the movable portion.

Therefore, in transporting the Fourier transform spectrophotometer or the like, it is possible to cause the movable portion and the movable mirror to stay at the standby position.

Accordingly, in transporting the Fourier transform spectrophotometer or the like, it is possible to prevent the movable portion and the movable mirror from being damaged upon movement, for example.

(3) In addition, the Fourier transform spectrophotometer may further include a stopper. The stopper stops the movable portion, to which an external force is applied by the external force applying portion, at the standby position.

With such a configuration, it is possible to maintain the state in which the movable portion and the movable mirror are disposed at the standby position.

According to the present invention, in the Fourier transform spectrophotometer, when the movable mirror is slid, an external force is applied to at least one of the movable portion and the holding portion in a direction intersecting the sliding direction by the external force applying portion, and the rolling element is prevented from moving in a play space. Therefore, when the movable mirror is slid, it is possible to suppress rattling of the movable portion and the holding portion while leaving a fine gap between the movable portion, the holding portion, and the rolling element. This makes it possible to easily control the moving speed of the movable mirror and to suppress rattling of the movable mirror. That is, in the Fourier transform spectrophotometer, it is possible to suppress rattling of the movable mirror while realizing smooth movement of the movable mirror.

BRIEF DESCRIPTION OF THE DRAWINGS

FIG. 1 is a schematic sectional view showing a state of an infrared spectrophotometer according to an embodiment of the present invention when seen from a side surface side;

FIG. 2 is a sectional view taken along line A-A of FIG. 1;

FIG. 3 is a front view showing a movable mirror of the infrared spectrophotometer and surrounding members thereof;

FIG. 4 is a side view of FIG. 3;

FIG. 5 is a sectional view taken along line B-B of FIG. 4;

FIG. 6 is a perspective view showing a detailed configuration of an interferometer chamber of the infrared spectrophotometer;

FIG. 7A is a side view showing the detailed configuration of the interferometer chamber of the infrared spectrophotometer, in which a movable mirror and a movable portion are disposed at a standby position;

FIG. 7B is a side view showing the detailed configuration of the interferometer chamber of the infrared spectrophotometer, in which the movable mirror and the movable portion slide and move from the state shown in FIG. 7A;

FIG. 8A is a sectional view of the infrared spectrophotometer shown in FIG. 7A;

FIG. 8B is a sectional view of the infrared spectrophotometer shown in FIG. 7B; and FIG. 9 is a sectional view showing the guide member of the infrared spectrophotometer, showing the configuration of the guide member when the movable mirror moves.

DETAILED DESCRIPTION OF THE PREFERRED EMBODIMENTS

1. Overall Configuration of Infrared Spectrophotometer

FIG. 1 is a schematic sectional view showing a state of an infrared spectrophotometer 1 according to an embodiment of the present invention when seen from a side surface side. FIG. 2 is a sectional view taken along line A-A of FIG. 1. The infrared spectrophotometer 1 is, for example, a Fourier transform infrared spectrophotometer (FTIR), and its outer shape is partitioned by a rectangular parallelepiped housing 2. The housing 2 is a hollow member. The housing 2 is partitioned into a sample chamber 4 in which a sample holder 3 is provided, an interferometer chamber 5 formed on one side (right side) of the sample chamber 4, and a detector chamber 6 formed on the other side (left side) of the sample chamber 4. A partition wall 21 is provided between the sample chamber 4 and the interferometer chamber 5, and a partition wall 22 is provided between the sample chamber 4 and the detector chamber 6. A sample S is stored in the sample holder 3.

The interferometer chamber 5 is provided with optical components constituting a Michelson interferometer, and the detector chamber 6 is provided with optical components such as a detector (not shown).

More specifically, as shown in FIG. 1, the interferometer chamber 5 is provided with a first mirror 7, a second mirror 8, a beam splitter 9, a movable mirror 10, a drive mechanism 11, and a fixed mirror 12.

The first mirror 7 is provided near a first opening 21A formed on the rear side of a partition wall 21.

The second mirror 8 is provided near a second opening 21B formed on the front side in the partition wall 21.

The beam splitter 9 is spaced apart from each of the first mirror 7 and the second mirror 8. The beam splitter 9 reflects part of incident light while transmitting the rest of the incident light.

The movable mirror 10 is disposed below the first mirror 7 and is spaced apart from the beam splitter 9. The movable mirror 10 is configured to be slidable along a direction facing the beam splitter 9. The detailed configuration of the movable mirror 10 will be described later.

The drive mechanism 11 is formed of, for example, a voice coil motor and the like, and is configured to apply a driving force to the movable mirror 10.

The fixed mirror 12 is disposed below the second mirror 8 and is disposed so as to be spaced apart from the beam splitter 9. The fixed mirror 12 is fixed at a prescribed position.

In analyzing a sample using the infrared spectrophotometer 1, first, infrared light is emitted from a light source (not shown). Then, as shown in FIG. 1, the infrared light is guided from the first opening 21A into the interferometer chamber 5, reflected by the first mirror 7, and incident on the beam splitter 9.

Part of the infrared light incident on the beam splitter 9 is transmitted through the beam splitter 9 and is incident on the fixed mirror 12, and the rest of the infrared light is reflected by the beam splitter 9 to enter the movable mirror 10. At this time, the movable mirror 10 slides and moves as it receives a driving force from the drive mechanism 11.

The infrared light reflected by the fixed mirror 12 is reflected by the beam splitter 9 and travels toward the second mirror 8. The infrared light reflected by the movable mirror 10 is transmitted through the beam splitter 9 and travels toward the second mirror 8. As a result, the infrared light reflected by the fixed mirror 12 and the infrared light reflected by the movable mirror 10 are combined into infrared interference light and reflected by the second mirror 8.

As shown in FIG. 2, the infrared light (infrared interference light) reflected by the second mirror 8 passes through a window member 13 provided at the second opening 21B and is applied to the sample S on the sample holder 3. Reflected light or transmitted light from the sample S exits from the sample holder 3, passes through a third opening 22A formed in a partition wall 22, and is incident on the detector (not shown) in the detector chamber 6. The detector outputs an interferogram corresponding to the incident infrared light as a detection signal. A control unit (not shown) obtains spectral intensity distribution data by Fourier transforming the interferogram output from the detector. Then, based on the data, the sample S is analyzed.

2. Detailed Configuration of Movable Mirror and Surrounding Members Thereof

FIG. 3 is a front view showing the movable mirror 10 of the infrared spectrophotometer 1 and surrounding members thereof. FIG. 4 is a side view of FIG. 3. FIG. 5 is a sectional view taken along line B-B of FIG. 4.

As shown in FIGS. 3 and 4, the movable mirror 10 includes a mirror 31 and a support portion 32.

The mirror 31 is a planar mirror formed in a circular shape when viewed from the front.

The support portion 32 is connected to the mirror 31. The support portion 32 includes a base portion 321 and a body portion 322.

The base portion 321 constitutes the lower end portion of the support portion 32, and is formed in an elongated plate shape.

The body portion 322 is formed in a rectangular parallelepiped shape and extends upward from the central portion of the base portion 321.

The support portion 32 is connected to a moving portion 111 of the drive mechanism 11. The moving portion 111 is, for example, a coil constituting a voice coil motor, and is disposed on an opposite side to the mirror 31 with respect to the support portion 32. As shown in FIG. 4, the moving portion 111 includes a cylindrical portion 112, a flat plate portion 113, and an abutment portion 114.

The cylindrical portion 112 is formed in a cylindrical shape.

The flat plate portion 113 is formed in a plate shape and is provided at one end portion of the cylindrical portion 112. The flat plate portion 113 closes the internal space on the one end portion side of the cylindrical portion 112. The flat plate portion 113 is connected to the body portion 322 of the support portion 32.

The abutment portion 114 is provided on the inner surface of the flat plate portion 113. The abutment portion 114 is made of, for example, an elastically deformable material such as rubber. The abutment portion 114 protrudes from the inner surface of the flat plate portion 113 so as to bulge toward the inner space of the cylindrical portion 112. The abutment portion 114 is an example of a stopper. Other configurations of the drive mechanism 11 will be described later.

As shown in FIGS. 3 and 4, a first engaging portion 41 is attached to the support portion 32 of the movable mirror 10. The first engaging portion 41 is formed in an L shape in a plan view and is attached to the upper end portion of the body portion 322 of the support portion 32 by a fixture such as a screw. Specifically, the first engaging portion 41 is attached to a side surface (the right surface of the upper end portion) on the outer side of the upper end portion of the body portion 322, and protrudes toward the outer side (the right side).

One end portion of a spring 40 is attached to the first engaging portion 41. The other end portion of the spring 40 is attached to a second engaging portion 42 formed in an L shape in a side view. The spring 40 is, for example, a tension coil spring and is used in a tensioned state. The spring 40 is an example of an external force applying portion. The fixed state of the second engaging portion 42 in the housing 2 will be described later.

A guide member 50 is attached to the support portion 32 of the movable mirror 10. As shown in FIGS. 4 and 5, the guide member 50 includes a movable portion 51, a holding portion 52, and a plurality of rolling elements 53.

The movable portion 51 is formed in an elongated rod shape, and its sectional shape (sectional shape in a direction orthogonal to the longitudinal direction) is formed in a flattened rectangular shape. Grooves 51a are formed in the left and right side surfaces of the movable portion 51. Each groove 51a has a triangular section. The grooves 51a are recessed inwardly from the left and right side surfaces of the movable portion 51. The groove 51a is formed linearly (linearly in the front-rear direction) from one end edge to the other end edge of the movable portion 51 in the longitudinal direction. An upper surface of the movable portion 51 is attached to a lower surface of the base portion 321 of the support portion 32.

The holding portion 52 is disposed below the movable portion 51 with a small gap therebetween. The holding portion 52 includes a fixed plate 521 and a pair of holding plates 522.

The fixed plate 521 is formed in an elongated and flattened rod shape.

Each holding plate 522 has a rectangular section. The holding plates 522 protrude upward from both end portions of the fixed plate 521 in the width direction (the direction orthogonal to the longitudinal direction). A groove 522a is formed in the inner side surface of each holding plate 522 in the left-right direction (width direction). Each groove 522a has a triangular section and is recessed inwardly from the inner side surface of each holding plate 522. Each groove 522a is linearly formed (linearly in the front-rear direction) from one end edge to the other end edge of the holding plates 522 in the longitudinal direction. Each holding plate 522 faces the movable portion 51 with a small gap between them in the left-right direction (width direction).

Specifically, the groove 51a of the movable portion 51 and the groove 522a of the holding plate 522 are disposed so as to be spaced apart from each other. The fixed state of the holding portion 52 in the housing 2 will be described later.

The rolling element 53 is disposed in a region between the groove 51a of the movable portion 51 and the groove 522a of the holding plate 522 so as to have a play space.

FIG. 5 shows the configuration of the guide member 50 in a state in which an urging force of the spring 40 is not applied to the first engaging portion 41. In this state, there is a play space A1 between an end face (inclined surface) of the movable portion 51 in the groove 51a, an end face (inclined surface) of the holding plate 522 in the groove 522a, and each rolling element 53. In the state in which the play space A1 is present, each rolling element 53 is in contact with the movable portion 51 and the holding portion 52 at two points.

More specifically, in the state in which the play space A1 is present, each rolling element 53 is in contact with the end face (lower inclined surface) of the movable portion 51 in the groove 51a and the end face (lower inclined surface) of the holding plate 522 in the groove 522a. That is, the state in which the urging force of the spring 40 is not applied to the first engaging portion 41, a region between the upper surface of each rolling element 53, the end face (upper inclined surface) of the movable portion 51 in the groove 51a, and the end face (upper inclined surface) of the holding plate 522 in the groove 522a is formed as the play space A1.

In this manner, forming an adequate space between the movable portion 51, the holding portion 52, and each rolling element 53 makes the movable portion 51 smoothly slide and move with respect to the holding portion 52.

3. Arrangement of Movable Mirror and Surrounding Members Thereof in Housing

FIG. 6 is a perspective view showing the detailed configuration of the interferometer chamber 5 of the infrared spectrophotometer 1. FIG. 7A is a side view showing the detailed configuration of the interferometer chamber 5 of the infrared spectrophotometer 1. FIG. 8A is a sectional view of the infrared spectrophotometer shown in FIG. 7A. FIGS. 6, 7A, and 8A each show only the side portion (a part) of the housing 2, with the side end face being removed. In addition, in FIG. 6, an illustration of some of the internal parts is omitted.

In the housing 2, an inclined surface 23 is provided as a wall surface of the housing 2 which partitions the interferometer chamber 5. The inclined surface 23 is disposed below the first opening 21A (see FIG. 1). The inclined surface 23 is inclined upward toward the front.

The movable mirror 10 is provided on the inclined surface 23. Specifically, in the interferometer chamber 5, each of the holding portion 52 of the guide member 50 and the second engaging portion 42 are attached to the inclined surface 23 by a fixture such as a screw.

In this state, the movable portion 51 of the guide member 50 extends along the inclined surface 23. The spring 40 is held in a tensioned state between the first engaging portion 41 and the second engaging portion 42.

Further, the drive mechanism 11 includes a fixed portion 115 fixed at a prescribed position in the housing 2. The fixed portion 115 is disposed behind the movable mirror 10 in the housing 2 (inside the interferometer chamber 5). The fixed portion 115 is, for example, a magnet constituting a voice coil motor. The moving portion 111 is covered with the fixed portion 115. In addition, the central portion of the fixed portion 115 is accommodated inside the moving portion 111. In this example, the drive mechanism 11 uses a so-called moving coil scheme in which the coil moves, but may use a so-called moving magnet scheme in which the magnet moves.

4. Operation of Movable Mirror

In the state shown in FIGS. 7A and 8A, the movable mirror 10 and the movable portion 51 are positioned at the standby position. In the infrared spectrophotometer 1, when the standby state is set, such as when the power switch is turned off, the movable mirror 10 and the movable portion 51 are disposed at the standby position as shown in FIGS. 7A and 8A.

In this state, the spring 40 engages with the first engaging portion 41 and the second engaging portion 42 in a tensioned state, and is inclined with respect to a plane orthogonal to the inclined surface 23 (a plane vertically extending from the inclined surface 23). As a result, the urging force of the spring 40 is applied to the support portion 32 (the body portion 322) of the movable mirror 10 via the first engaging portion 41 in the direction toward the lower side of the inclined surface 23. In other words, an external force from the spring 40 is constantly applied to the support portion 32 (the body portion 322) of the movable mirror 10 via the first engaging portion 41 toward the standby position.

Further, in this state, the abutment portion 114 is in contact with the end face of the fixed portion 115.

Accordingly, even when the infrared spectrophotometer 1 wobbles during transportation or the like, the movable mirror 10 and the movable portion 51 can be kept at the standby position by the urging force of the spring 40.

Then, in the infrared spectrophotometer 1, when the power switch is turned on, a driving force from the drive mechanism 11 is applied to the movable mirror 10 (the support portion 32). As a result, the movable mirror 10 and the movable portion 51 slide and move relative to the holding portion 52.

FIG. 7B is aside view showing the detailed configuration of the interferometer chamber 5 of the infrared spectrophotometer 1, in which the movable mirror 10 and the movable portion 51 slide and move from the state shown in FIG. 7A. FIG. 8B is a sectional view of the infrared spectrophotometer 1 shown in FIG. 7B.

As shown in FIGS. 7B and 8B, when a driving force from the drive mechanism 11 is applied to the support portion 32, the movable mirror 10 and the movable portion 51 slide and move relative to the holding portion 52 and move to the central side along the inclined surface 23 against the urging force of the spring 40. At this time, as the rolling elements 53 roll in the guide member 50, the movable portion 51 moves with respect to the holding portion 52. In this manner, the mirror 31 of the movable mirror 10 approaches the beam splitter 9.

In addition, from this state, the driving force applied from the drive mechanism 11 to the support portion 32 is adjusted so that the movable mirror 10 and the movable portion 51 slide and move in the opposite direction with respect to the holding portion 52, and move downward along the inclined surface 23 (toward the standby position). At this time, the mirror 31 of the movable mirror 10 moves away from the beam splitter 9.

As described above, in the infrared spectrophotometer 1, when the power switch is turned on, the movable mirror 10 and the movable portion 51 repeat sliding movement so as to reciprocate along the inclined surface 23.

Subsequently, in the infrared spectrophotometer 1, when the power switch is turned off, as shown in FIGS. 7A and 8A, the movable mirror 10 and the movable portion 51 are disposed at the standby position. At this time, the abutment portion 114 comes into contact with the end face of the fixed portion 115 to restrict further movement of the movable mirror 10 and the movable portion 51 (the movable mirror 10 and the movable portion 51 stop at the standby position).

5. Detailed Operation of Guide Member

FIG. 9 is a sectional view showing the guide member 50 of the infrared spectrophotometer 1, showing the configuration of the guide member 50 when the movable mirror 10 moves.

As described above, when the movable mirror 10 slides and moves, an urging force (external force) from the spring 40 is applied to the support portion 32 of the movable mirror 10.

As shown in FIGS. 3 and 6, due to this urging force (external force), a downward force is applied to the first engaging portion 41. Further, the first engaging portion 41 is attached to an outer side surface (right surface) of the upper end portion of the body portion 322 of the support portion 32 so as to be displaced from the center of gravity when viewed in the front-rear direction. Therefore, a downward force is applied to the movable mirror 10 (the support portion 32). As a result, as indicated by an arrow C in FIG. 3, a force (rotational force) directed in the clockwise direction (one direction) in a front view is generated with respect to the movable mirror 10 (the support portion 32).

Subsequently, as shown in FIG. 9, a force directed in a clockwise direction in a front view is applied also to the movable portion 51 fixed to the support portion 32, and the movable portion 51 slightly moves (tilts) in the clockwise direction (one direction) in a front view.

As a result, the rolling elements 53 are in contact with the movable portion 51 and the holding portion 52 at three points. Further, in the guide member 50, a fine gap A2 is formed in place of the play space A1.

Specifically, on the inner side (left side) of the movable portion 51, the rolling element 53 is in contact with the end faces (upper and lower inclined surfaces) of the holding plate 522 in the groove 522a at two points, and is in contact with the end face (lower inclined surface) of the movable portion 51 in the groove 51a at one point. At this time, the fine gap A2 is formed between each rolling element 53 and the end face (upper inclined surface) of the movable portion 51 in the groove 51a.

On the outer side (right side) of the movable portion 51, the rolling element 53 is in contact with the end faces (upper and lower inclined surfaces) of the holding plate 522 in the groove 522a at two points, and is in contact with the end face (the upper inclined surface) of the movable portion 51 in the groove 51a at one point. At this time, the fine gap A2 is formed between each rolling element 53 and the end face (lower inclined surface) of the movable portion 51 in the groove 51a.

As described above, while the movable portion 51 is slightly inclined in the clockwise direction in a front view, the movable mirror 10 and the movable portion 51 slide and move relative to the holding portion 52. That is, while the fine gap A2 is formed between each rolling element 53 and the movable portion 51, the movable mirror 10 and the movable portion 51 slide and move so as to keep the movable portion 51 in a slightly inclined state. This prevents each rolling elements 53 from moving between the movable portion 51 and the holding portion 52. This can suppress rattling (rattling in the circumferential direction in a front view) of the movable mirror 10 and the movable portion 51 while realizing smooth movement of the movable mirror 10 and the movable portion 51.

In addition, the fixed mirror 12 (see FIG. 1) is provided with an actuator and a screw for adjustment. By adjusting these members, the angle of the reflecting surface of the fixed mirror 12 can be finely adjusted. Therefore, when the angle of the mirror 31 of the movable mirror 10 slightly changes, it is possible to change the reflecting surface of the fixed mirror 12 so as to correspond to the amount of change (so as to correct the amount of change).

7. Function and Effect (1) According to this embodiment, in the infrared spectrophotometer 1, the plurality of rolling elements 53 are provided between the movable portion 51 and the holding portion 52. As shown in FIG. 5, while no external force is applied from the spring 40, the play space A1 is generated between the movable portion 51, the holding portion 52, and each rolling element 53. In the infrared spectrophotometer 1, when the movable mirror 10 and the movable portion 51 are slid, an external force directed downward is applied to the movable portion 51 by the spring 40, thereby preventing each rolling element 53 from moving between the movable portion 51 and the holding portion 52.

Accordingly, when the movable mirror 10 and the movable portion 51 are slid, it is possible to suppress rattling of the movable portion 51 and the holding portion 52 while leaving the fine gap A2 between the movable portion 51, the holding portion 52, and each rolling element 53.

This makes it possible to easily control the moving speeds of the movable mirror 10 and the movable portion 51 and to suppress rattling of the movable mirror 10 and the movable portion 51.

That is, in the infrared spectrophotometer 1, it is possible to suppress rattling of the movable mirror 10 and the movable portion 51 while realizing smooth movement of the movable mirror 10 and the movable portion 51.

(2) According to this embodiment, as shown in FIG. 7B, in the infrared spectrophotometer 1, the spring 40 applies an external force to the movable mirror 10 and the movable portion 51 toward the standby position.

Accordingly, the spring 40 can always apply an external force to the movable mirror 10 and the movable portion 51 toward the standby position.

As a result, when the infrared spectrophotometer 1 is transported or the like, the movable mirror 10 and the movable portion 51 can be kept at the standby position.

Accordingly, when the infrared spectrophotometer 1 is transported or the like, it is possible to prevent the movable mirror 10 and the movable portion 51 from moving and being damaged, or the like.

(3) According to this embodiment, when the movable mirror 10 and the movable portion 51 move toward the standby position in the infrared spectrophotometer 1, the abutment portion 114 abuts against the end face of the fixed portion 115, thereby restricting further movement of the movable mirror 10 and the movable portion 51.

This can keep the state in which the movable mirror 10 and movable portion 51 are disposed at the standby position.

8. Modification

In the above embodiment, as described above, the spring 40 as an external force applying portion applies an external force to the movable portion 51 downward. However, the spring 40 as an external force applying portion may be configured to apply an external force to the movable portion 51 in a direction intersecting with the sliding direction. For example, the spring 40 may apply an external force to the movable portion 51 upward.

In the above embodiment, the description has been made that the spring 40 as an external force applying portion applies an external force to the movable portion 51. However, an external force from the external force applying portion may be applied to the holding portion 52.

Further, in the above embodiment, although the spring 40 has been described as an external force applying portion, a weight may be attached to the first engaging portion 41 to be used as an external force applying portion.

What is claimed is:

1. A Fourier transform spectrophotometer comprising:

a movable portion to which a movable mirror is attached;

a holding portion configured to slidably hold the movable portion;

a rolling element provided between the movable portion and the holding portion so as to have a play space with respect to the movable portion and the holding portion while no external force is applied, the rolling element being configured to roll when the movable portion slides with respect to the holding portion; and an external force applying portion configured to prevent the rolling element from moving between the movable portion and the holding portion by applying a rotational force to at least one of the movable portion and the holding portion in a circumferential direction intersecting with and about a sliding direction of the movable portion, wherein the rolling element is a sphere, and in a case where the movable portion slides with respect to the holding portion, as the rotational force is applied by the external force applying portion, the movable portion tilts with respect to the holding portion, and a number of points of contact of the rolling element with respect to the movable portion or the holding portion increases.

2. The Fourier transform spectrophotometer according to claim 1, wherein
the movable portion is slidable from a standby position along the sliding direction, and
the external force applying portion applies an external force to the movable portion toward the standby position.

3. The Fourier transform spectrophotometer according to claim 2, further comprising a stopper configured to stop the movable portion, to which an external force is applied by the external force applying portion, at the standby position.

4. The Fourier transform spectrophotometer according to claim 1, wherein
the external force applying portion is configured to prevent the rolling element from moving between the movable portion and the holding portion by applying the rotational force to the at least one of the movable portion and the holding portion in the circumferential direction intersecting with the sliding direction of the movable portion, such that the points of contact of the rolling element with the movable portion and the holding portion is changed from when the rotational force is not applied.

5. The Fourier transform spectrophotometer according to claim 4, wherein
the external force applying portion is configured to prevent the rolling element from moving between the movable portion and the holding portion by applying the rotational force to the at least one of the movable portion and the holding portion in the circumferential direction intersecting with the sliding direction of the movable portion, such that the movable portion becomes tilted with respect to the holding portion.

6. The Fourier transform spectrophotometer according to claim 1, wherein
the external force applying portion is a spring connected to the movable portion and the holding portion at respective ends of the spring.

7. The Fourier transform spectrophotometer according to claim 6, wherein
the spring is configured to cause the movable portion to become tilted with respect to the holding portion when the spring applies the rotational force, such that the points of contact of the rolling element with the movable portion and the holding portion is changed from when the rotational force is not applied.

* * * * *

UNITED STATES PATENT AND TRADEMARK OFFICE
CERTIFICATE OF CORRECTION

PATENT NO. : 10,837,829 B2
APPLICATION NO. : 16/181776
DATED : November 17, 2020
INVENTOR(S) : Tadafumi Kamikake It is certified that error appears in the above-identified patent and that said Letters Patent is hereby corrected as shown below:

On the Title Page

Column 1, item (72), the Inventor name:
Delete "Tadafusa Kamikake, Kyoto (JP)"
Insert --Tadafumi Kamikake, Kyoto (JP)--

Signed and Sealed this
Twelfth Day of November, 2024

Katherine Kelly Vidal
*Director of the United States Patent and Trademark Office*